(12) United States Patent
Sugimoto et al.

(10) Patent No.: US 7,972,644 B2
(45) Date of Patent: Jul. 5, 2011

(54) BOTTLEABLE GREEN TEA BEVERAGE

(75) Inventors: Akio Sugimoto, Shizuoka (JP); Naomi Furuse, Shizuoka (JP); Kozo Nagata, Shizuoka (JP); Hirokazu Hosoyama, Shizuoka (JP); Takanobu Takihara, Shizuoka (JP); Hiroshi Kinugasa, Shizuoka (JP)

(73) Assignee: Ito En, Ltd., Tokyo (JP)

( * ) Notice: Subject to any disclaimer, the term of this patent is extended or adjusted under 35 U.S.C. 154(b) by 989 days.

(21) Appl. No.: 11/385,837

(22) Filed: Mar. 22, 2006

(65) Prior Publication Data

US 2007/0224332 A1  Sep. 27, 2007

(51) Int. Cl.
*A23F 3/16* (2006.01)
*A23L 1/28* (2006.01)

(52) U.S. Cl. ........ 426/590; 426/435; 426/490; 426/495; 426/531; 426/597; 426/655

(58) Field of Classification Search .................. 426/597, 426/590, 531, 435, 495, 655, 490
See application file for complete search history.

(56) References Cited

U.S. PATENT DOCUMENTS

| | | | |
|---|---|---|---|
| 6,797,305 B2 | 9/2004 | Niino et al. | |
| 2003/0096050 A1* | 5/2003 | Inaoka et al. | 426/597 |
| 2003/0185950 A1* | 10/2003 | Niino et al. | 426/435 |
| 2004/0097430 A1* | 5/2004 | Zhao et al. | 514/27 |
| 2005/0287278 A1* | 12/2005 | Quan et al. | 426/597 |

FOREIGN PATENT DOCUMENTS

| | | |
|---|---|---|
| CN | 1141026 C | 3/2004 |
| CN | 1656911 A | 8/2005 |
| JP | 61-271969 A | 12/1986 |
| JP | 10-248538 A | 9/1998 |
| JP | 3329799 | 5/2002 |
| JP | 3342698 | 8/2002 |
| JP | 3360073 | 8/2002 |
| JP | 3338705 | 9/2002 |
| JP | 2006042728 A * | 2/2006 |
| JP | 2006-115788 A | 5/2006 |
| WO | WO 2006/013930 A1 | 2/2006 |

OTHER PUBLICATIONS

Effects of Dosing Condition on the Oral Bioavailability of Green Tea Catechins after Single-DoseAdministration of Polyphenon E in Healthy Individuals by H-H. Sherry Chow et al. Clinical Cancer Research 2005; Jun. 15, 2005.*
Translation of JP 2006042728 A (OiE et al.), see above.*
Chen, Zhen Yu, et al., XP-002270296 "Degradation of Green Tea Catechins in Tea Drinks" Journal of Agricultural and Food Chemistry, American Chemical Society, Washington, US, vol. 49, No. 1, Jan. 2001, pp. 477-482.
Rompp Online, http://www.roempp.com, Thieme Verlag.
Office Action issued by the Canadian Intellectual Property Office for Canadian Patent Application No. 2,541,255 dated May 19, 2009.
Chinese Office Action dated Aug. 21, 2009, issued in corresponding Chinese application, CN 200610074728.4.
Kinugasa et al., "Differences of Flavor Components Found in Green Team Canned Drinks Made from Tea leaves Plucked on Different Mature Stage," (1997) pp. 112-118, vol. 44, No. 2, Nippon Shokuhin Kagaku Kogaku Kaisha, Japan.

* cited by examiner

*Primary Examiner* — Brent T O'Hern
(74) *Attorney, Agent, or Firm* — Sughrue Mion, PLLC

(57) ABSTRACT

With the object of providing a bottleable green tea beverage for selling hot, a bottleable green tea beverage was prepared, which is a bottleable green tea beverage containing a green tea extract obtained by extracting green tea leaves, wherein the content in epigallocatechin gallate and gallocatechin gallate is 380 mg/l to 1500 mg/l as a total value, the content of glutamic acid is 20 mg/l to 120 mg/l, the diff-use transmittance is 1.0% or less, and the pH is 5 to 7.

8 Claims, No Drawings

BOTTLEABLE GREEN TEA BEVERAGE

BACKGROUND OF THE INVENTION

1. Field of the Invention

The present invention relates to a bottleable green tea beverage containing a high concentration of catechins; in particular, the invention relates to a bottleable green tea beverage having an inhibitory effect on the development of sediment during long-term storage when sold hot; furthermore, with improved palatability of the taste provided by the catechins.

2. Related Art Statement

Green tea beverage is an enjoyable drink, as it is a tea beverage that balances taste, such as astringency, flavor, and bitterness. Furthermore, recently, with the change in lifestyle together with the expectation of catechins' contribution to health and the demand for palatability emphasizing the taste that catechins have, bottleable green tea beverages containing high concentrations of catechins have been developed.

Japanese Patent Publication No. 3329799 and Japanese Patent Publication No. 3338705 disclose a bottleable beverage and a method for preparing a bottleable beverage that determines the mixing proportion and the concentrations of non-epicatechins and epicatechins, and Japanese Patent Publication No. 3342698 and Japanese Patent Publication No. 3360073 disclose a bottleable beverage containing a circular dextrin or a water-soluble macromolecule with the object of preventing the occurrence of sediment in a bottleable beverage containing non-epicatechins and epicatechins.

SUMMARY OF THE INVENTION

As "primary sediment" starts to deposit immediately after beverage preparation, a common green tea beverage is prepared by completely removing this "primary sediment" in the preparation process and then filling a container. However, a frequently-arising problem is that, after the container has been filled, "secondary sediment" (distinct from "primary sediment"; hereinafter, in the present invention, this "secondary sediment" is simply referred to as "sediment") occurs over time during conservation in the form of supernatant, white cloud, flock (cotton), or precipitate. In particular, when selling a heated green tea beverage bottleable in a PET bottle, the heating promotes the occurrence of sediment, and the sediment occurring inside the container is an important issue, not only to the extent that the flavor and taste of green tea beverage are compromised, but also to the extent that the value of the product will be lost due to its poor appearance. In this case, the higher concentration of catechins included, the more sediment produced. In addition, a bottleable green tea beverage containing high concentrations of catechins also has the problem of a bad balance occurring between astringency and other tastes, lacks palatability, and even unpleasant feelings are felt.

It is an object of the present invention to provide a bottleable green tea beverage having a high concentration of catechins with high biological functionality, nonetheless, clarity can be maintained, and flavor and quality are satisfactory from the viewpoint of palatability, and, in particular, a bottleable green tea beverage appropriate for selling hot.

As a result of earnest studies in view of the aforementioned problems in bottleable green tea beverage containing a high concentration of catechins, the present inventors discovered that, in a bottleable green tea beverage containing a high concentration of catechins, the occurrence of sediment in the bottleable green tea beverage was related to the concentration of glutamic acid and diffuse transmittance and completed the present invention.

The present invention provides a bottleable green tea beverage, which is a bottleable green tea beverage containing a green tea extract obtained by extracting green tea leaves, containing a total value of 380 mg/l to 1500 mg/l of epigallocatechin gallate and gallocatechin gallate, and containing 20 mg/l to 120 mg/l of glutamic acid, and the diffuse transmittance is 1.0% or less.

In addition, the invention provides a bottleable green tea beverage, which is the above bottleable green tea beverage, wherein the product temperature of the bottleable green tea beverage is 50° C. to 70° C.

In addition, the invention provides a bottleable green tea beverage, which is the above bottleable green tea beverage, wherein the pH is from 5 to 7.

According to the present invention, among the catechins, EGCg and GCg which are effective in physiological function, can be effectively ingested. Further, development of sediment can also be prevented during long-term conservation when sold hot, while at the same time, the flavor and taste that the green tea beverage has intrinsically can be maintained and improved., Consequently, a bottleable green tea beverage containing high concentrations of catechins can be provided, which is suitable for selling not only from refrigerated to ordinary temperature, but also up to hot temperature.

Note that, in the present invention, a "green tea beverage" means a beverage containing green tea extract, which is obtained by extracting green tea leaves, and preferably is a beverage containing 50% or more of the extract.

A "bottleable green tea beverage" means a green tea beverage, which is a green tea beverage that can be drunk without diluting, and which can be provided in the form of a conventional container similar to conventional beverages, such as a formed container made of plastic, for instance, a formed container with polyethylene terephthalate as a main component (so-called PET bottle), a metal can, a paper container combined with a metal foil or a plastic film, or a bottle.

In addition, in the present invention, "selling hot" means warming a bottleable green tea beverage up to a temperature that allows provision to a consumer, or the like, in a warm state and maintaining the beverage at this temperature. For instance, this means heating a bottleable green tea beverage by direct exposure, conduction, or radiation from a 50° C. to 120° C. heat source, or by a microwave, or the like, maintaining the product temperature of the bottleable green tea beverage product at 40° C. to 100° C., preferably at 50° C. to 70° C., among which 55° C. to 60° C. is preferred, and providing a consumer or the like, with the tea while this temperature is kept.

DESCRIPTION OF THE PREFERRED EMBODIMENT

In the following, an embodiment of the beverage of the present invention will be described. However, the scope of the present invention is not limited to the embodiment described below.

The bottleable green tea beverage related to the present embodiment is a bottleable green tea beverage, which contains a green tea extract obtained by extracting green tea leaves, containing a total value of 380 mg/l to 1500 mg/l of epigallocatechin gallate and gallocatechin gallate, additionally containing 20 mg/l to 120 mg/l of glutamic acid, and having a diffuse transmittance of 1.0% or less.

Epigallocatechin gallate (hereinafter referred to as EGCg) and gallocatechin gallate (hereinafter referred to as GCg) are compounds with extremely strong bitterness and astringency, while at the same time they are known to be useful compounds with high biological activity and can be determined and quantified by a method using high performance liquid chromatography (HPLC) that uses detection at ultraviolet wavelengths.

EGCg, which is an epimer catechin, is a compound in which a catechin backbone and gallic acid are ester-bonded and can be obtained by a method well known in the art, or a method that will be well known in the future. Specifically, as EGCg exists in natural plants, including tea leaves, it can be obtained by extraction from a natural plant with water or hot water, or a water soluble organic solvent, such as ethanol, or a mixture thereof. Furthermore, in order to increase the content in EGCg, performing concentration or separation/purification is preferred.

GCg, which is a non-epimer catechin, almost does not exist in natural plants, including tea leaves. However, it can be obtained, for instance, by heat treatment of EGCg at approximately 80° C. or more to promote heat isomerization (epimerization).

That is to say, by heating at approximately 80° C. or above, purified EGCg or a mixture containing EGCg or a catechin composition containing EGCg, such as a tea extract or an infusion, to promote heat isomerization of EGCg, the concentration in GCg content can be increased. In addition, concentration or separation/purification from this heat-treated compound is also possible to elevate the concentration of GCg.

In order to include EGCg and GCg, a catechin composition containing EGCg and GCg, such as a tea extract or a commercially available tea extract can be added.

One or more species among purified EGCg and GCg can be added and mixed so that the composition of EGCg and GCg becomes as desired.

The glutamic acid used in the present embodiment is preferably L-glutamic acid or sodium L-glutamate salt. In addition, any grade of glutamic acid, for food additive use, for medicinal use or for reagent use, can be used. In addition, materials containing glutamic acid derived from a natural compound can also be used, among which, from the viewpoint of flavor, a material derived from tea is preferred. For instance, a highly concentrated green tea extract or an extract in which the concentration in glutamic acid has been elevated by removing catechins, polysaccharides, and the like from a green tea extract can be used. The glutamic acid contained in the green tea beverage can be quantified using the HPLC method and an amino acid analyzer.

In addition to catechins, amino acids are known to contribute to a green tea beverage as components related to the taste (sweet taste, pleasant taste) of a common green tea beverage. The amino acids contained in a green tea beverage are theanine, glutamic acid, aspartic acid, arginine, serine, and the like, and these are believed to amount to 90% or more of the total amino acid contained in a green tea beverage (Shin Chagyo Zensho, 8th Edition, Chamber of Tea Association of Shizuoka Prefecture, 1988).

Among these, glutamic acid and salt thereof, in addition to being known as flavorants and food additives as pleasant taste components, are known as additives related to alleviating bitter taste and astringency of food and medicine (Refer to, for instance, Japanese Patent Application Laid-Open No. 2000-204036, Japanese Patent Application Laid-Open No. 2001-69961, and Japanese Patent Application Laid-Open No. 2003-160484). In addition, Nakagawa reports the variation of taste structure and palatability in a case where glutamic acid and sucrose were added to a green tea simultaneously (Muneyuki Nakagawa, Taste and Chemical Components of Green Tea, Tea Research Journal, Vol. 40, 1-9, 1973). According to this, it is reported that, when the concentrations of glutamic acid and sucrose added were raised, the intensities regarding bitter taste and astringency tended to increase with a glutamic acid concentration of 1%; these intensities decreased with an addition of 2% to 4%, and palatability decreased with the addition of glutamic acid and sucrose, the taste becoming unpleasant and not qualifying as that of a green tea.

It is important that bottleable green tea beverage related to the present embodiment has a diffuse transmittance of 1.0% or less, and being from 0.1% to 1.0% is important, taking measurement limitation into consideration. If 1.0% or less, occurrence of sediment can be prevented, even when serving bottleable green tea beverage for selling hot.

Regarding adjustment of diffuse transmittance, the adjustment can be performed by supplying a green tea extract, which is to be a raw material of the bottleable green tea beverage, to an ultrafiltration step by sampling a portion from any of the green tea extracts immediately after the ultrafiltration step or before and after the heat sterilization step, or a bottleable green tea beverage immediately after manufacture, measuring the diffuse transmittance for each lot and managing adequately with the criteria of 1.0% or less. In addition, it has been verified that, once adjusted, the diffuse transmittance almost does not change, even if the bottleable green tea beverage is stored under heat (for two weeks at 60° C.).

Even if the diffuse transmittance is more than 1.00%, in the present invention, the diffuse transmittance is taken as within the criteria of 1.0% or less as long as it can be rounded to the first decimal place and become include the range of 1.0% or less, as long as the value allows occurrence of sediment to be prevented.

Here, the diffuse transmittance is measured according to JIS K7105. Regarding diffuse transmittance, a relationship exists between the total light transmittance and haze as in the following formula:

(Formula 1)

$$\text{Haze (\%)} = (\text{diffuse transmittance/total light transmittance}) \times 100$$

The diffuse transmittance can be obtained, using a commercially available hazemeter, by placing a sample in a glass cell whose optical path length is known and directly measuring the transmitted scattering light.

(Method for Preparing a Bottleable green tea beverage)

The bottleable green tea beverage related to the present embodiment can be prepared by, for instance, extracting green tea leaves with water or hot water, thereafter, mixing a catechin composition containing predetermined catechins to adjust the quantities of EGCg and GCg, furthermore, adding glutamic acid to adjust this quantity, while at the same time performing ultrafiltration so that the diffuse transmittance of the product becomes 1.0% or less, and in other steps by a similar method to common green tea beverages. Natural tea flavor can be drawn according to such a preparation method, which is preferred. In the following, one aspect of the method for preparing the bottleable green tea beverage related to the present embodiment will be described; however, the invention is not limited to this embodiment.

(Raw Tea Leaves)

As long as they are leaves collected from a tea plant (scientific name: *Camellia sinensis*), any tea species can be considered as the tea leaves to be used as raw materials, without limitation to the type, production region, harvest period, harvest method, cultivate method thereof, and the like. Fresh tea leaves and the like (containing leaf and stem) can also be used as raw tea leaves. In addition, any type among Sen-cha, Kamairi-cha, Kabuse-cha, Gyokuro, Ten-cha, Matcha, Ban-cha, Houji-cha, steamed Tamaryoku-cha, pan-fired Tamaryoku-cha, Ureshino-cha, Aoyagi-cha, and the like can be used as raw tea leaves, as long as it is crude tea obtained by crude tea processing, which stops enzymatic activity by such means as steaming or roasting of these fresh tea leaves and the like, or refined tea based thereon. In addition, two or more types of these crude teas or refined teas may be combined, and preparation may include a flavorant.

(Extraction Step)

Extraction of green tea leaves that allows extraction of green tea component to be performed taking the flavor into account is sufficient, with no particular limitation on the extraction method, extraction conditions, and the like. For instance, the extraction temperature range can be from cold water to hot water. In addition, an extract extracted with cold water and an extract extracted with hot water can be combined and used. The settings for the amount of extraction water and the extraction time can be set at will to suit the extraction temperature range and the required extraction efficiency. Also, the extractor only needs to have a structure that allows sufficient extraction work to be carried out, and, for instance, a kneader or the like can be used. Stirring and pressure adjustment (pressurized extraction) are adequately performed as necessary during extraction. In addition to pure water, hard water, soft water and ion-exchanged water, ascorbic acid-containing aqueous solution, pH-adjusted water, and the like can be given as examples of extraction water used in the extraction.

Adequately, the green tea extract obtained by extraction is cooled to the order of 5° C. to 40° C. as necessary; at the same time, or before or after, ascorbic acid, sodium ascorbate or the like is added to the green tea extract as necessary, which is adjusted to be acidic (pH 4 to 5). By carrying out cooling or acidity adjustment, or both, of the green tea extract, oxidation of the extracted components can be prevented, while at the same time components causing primary sediment can be precipitated and the efficiency of filtration carried out in the subsequent step can be increased.

(Ultrafiltration Step)

Next, the green tea extract extracted as described above is subjected to ultrafiltration. Ultrafiltration allows the diffuse transmittance to be 1.0% or less while keeping the original flavor of green tea, and as a result, the occurrence of sediment when the green tea extract is turned into bottleable green tea beverage can be suppressed suitably.

In the present embodiment, ultrafiltration means filtration (separation) that removes substances of roughly 1 μm or larger, and, for instance, filtration by diatomaceous earth, filter filtration, MF membrane separation, UF membrane separation, and the like can be cited, among which kieselguhr filtration is preferred. In addition, two or more of these filtration methods may be used concomitantly.

Here, kieselguhr filtration is a cake filtration using diatomaceous earth as a filter aid. Diatomaceous earth is the earth resulting over long years from phytoplanktons called diatoms which deposited at the bottom of the sea or the bottom of a lake and fossilized, accumulating microscopic diatom clusters. As the diameter is from several to several tens of micrometers, and there are numerous microscopic holes of 0.1 μm to 1.0 μm on the surface, forming a compact cake layer of filter aid on a wire mesh or a filter cloth allows a clarified solution to be obtained at filtration time. The main component of diatomaceous earth is silica ($SiO_2$), in particular, amorphous silica, those purified by firing being generally used in filter aid applications.

Diatomaceous earth can be used as long as it is diatomaceous earth used as a filter aid, such as diatomaceous earth ore that has been ground and dried, or ground and dried and further fired or flux fired, among which a kieselguhr filter aid with 0.05 to 0.1 Darcy is preferably used. Preparation of a much clearer bottleable green tea beverage is possible by using a kieselguhr filter aid with 0.05 to 0.1 Darcy.

"Kieselguhr filter aid with 0.05 to 0.1 Darcy" means a kieselguhr filter aid with a Darcy transmittance K in the range of 0.05 to 0.1. "Darcy transmittance K" is an index to indicate the permeability of a filter aid and can be determined by water permeation method or air permeation method.

In addition, for the diatomaceous earth used in the present embodiment, the use of diatomaceous earth from which iron has been removed by elution with acid treatment is preferred. This is not only because iron influences taste in green tea beverages, but additionally because it is also the cause of browning. In addition, another filter aid, such as silica gel, pearlite, or cellulose may be mixed and used with diatomaceous earth.

As a method for kieselguhr filtration, it suffices to add diatomaceous earth of a desired amount to green tea extract, carry out suitable stirring or auto-circulation by a pump, to contact green tea extract and diatomaceous earth for a predetermined time, then, separate and remove diatomaceous earth with a filtration unit. In so doing, the batch method or the semi-continuous method can be chosen according to the amount of green tea extract treated. As one example of semi-continuous method, it suffices to precoat the support surface of the membrane filter with diatomaceous earth, and while injecting (body feeding) kieselguhr filtration agent as necessary to the green tea extract, which becomes a stock solution, send the stock solution to the precoated filtration unit. In so doing, as preparing two or more filtration units to carry out cake extraction and reverse-wash with one during filtration with the other is effective, it is preferred.

It suffices to adjust the amount of diatomaceous earth used and the contact time depending on the amount or concentration of the stock solution of green tea extract used. For instance, when the green tea extract is prepared using an amount of extraction water of 20 to 100 fold with respect to the raw tea leaves, if, in terms of total amount of precoating and body feed, 0.1 to 5 mass percent per green tea extract is contacted for 5 minutes to 120 minutes, the diffuse transmittance can suitably become 1.0% or less.

In order to eliminate primary sediment occurring during extraction, a coarse filtration step can also be introduced prior to the ultrafiltration step. Here, the coarse filtration step is a step for eliminating extraction residues, such as tea leaves and large particles. For instance, stainless filter, flannel cloth, strainer, centrifugal separation, and other general filtration method to eliminate extraction residues can be suitably used in combination. In addition, primary sediment may be eliminated at the same time in the ultrafiltration step.

(Combination)

Next, a predetermined catechin composition is added to the green tea extract prepared as described above to adjust the amount of EGCg and GCg so that the total concentration of EGCg and GCg is 380 mg/l to 1500 mg/l, preferably 590 mg/l to 1000 mg/l.

A green tea beverage containing a total concentration of 380 mg/l to 1500 mg/l in EGCg and GCg allows EGCg and GCg to be effectively drunk, which, among the catechins, are effective in physiological function and allows bottleable green tea beverage having taste palatability to be provided.

The catechin composition can be prepared by means of adjustment of the amount of EGCg and GCg by adding one or more species of purified EGCg and GCg. In addition, tea extracts obtained by extracting tea leaves from non-fermented tea, semi-fermented tea, or fermented tea with water, hot water, or water-soluble organic solvent, and further carrying out a predetermined purification and concentration, and commercially available tea extracts can also be used to adjust the amount of EGCg and GCg. For instance, THEA-FLAN 30E, THEA-FLAN 30A, THEA-FLAN W, THEA-FLAN 90S (all manufactured by ITO EN Co., LTD.), SUNFLAVONE HG (Taiyo Kagaku Co., Ltd.), POLYPHENON 70A, POLYPHENON E (Mitsui Norin Co., Ltd.), Theacalone 90S (Tokiwa Phytochemical Co., Ltd.), CTP-95 (Citimex), Greenselect (Indena), Tea-Fresh 80S (Japan Chlorophyll Co., Ltd.), TEAVIGO (DSM Nutritional Products), or the like can be used.

Here, as an adjustment of the proportion of EGCg and GCg, an adjustment can be carried out, in which only purified EGCg or a tea extract containing large amounts of EGCg is added, treated with heat in a subsequent step, and isomerized into GCg from EGCg to raise the proportion of GCg. In particular, performing heat isomerization of EGCg at the same time as heat sterilization of the bottleable green tea beverage to include EGCg and GCg is suitable. Although the proportion of EGCg and GCg varies due to heat isomerization, the amount of catechins almost does not change if close to pH neutrality and below.

The bottleable green tea beverage related to the present embodiment can also be prepared by obtaining a temporary intermediate by removing a portion or the entirety, preferably from 50% to 100%, more preferably from 70% to 100%, of the catechins contained in the green tea extract immediately after extraction and then adding the above-mentioned catechin composition, such as a tea extract.

As a method for removing catechins from green tea extract, removal methods, such as resin adsorption by a synthetic adsorption resin or the like, membrane separation by an ultrafiltration membrane or a reverse osmosis membrane, gel filtration chromatography, solvent extraction, can be used. Among these, resin adsorption using PVPP, which is a synthetic adsorption resin, as it allows catechins to be adsorbed selectively, is suitable as a method for removing catechins. Furthermore, the method for removing catechins, which is an invention by the present applicants U.S. Pat. No. 3,315,304, is particularly suitable. In so doing, the amount of the synthetic adsorption resin PVPP is adequately selected depending on the quantity or concentration of catechin composition contained in the green tea extract.

Next, glutamic acid is added to the green tea extract to adjust the concentration of glutamic acid to be from 20 mg/l to 120 mg/l, preferably from 24 mg/l to 113 mg/l, and more preferably from 38 mg/l to 113 mg/l.

In general, since glutamic acid contained in green tea leaves is extracted in a green tea extract, the concentration of glutamic acid contained in a green tea extract depends on the concentration of green tea extract. Consequently, it suffices to adjust the amount of glutamic acid added according to the extraction conditions of green tea leaves. Furthermore, it suffices to add and dissolve the glutamic acid before the green tea extract extracted in the extraction step becomes held in a container, and preferably, a step for adjusting the amounts of EGCg and GCg, then adding and dissolving the glutamic acid may be established. In addition, a material containing a high concentration of glutamic acid may be added as well.

In addition, an additive, such as oxidation inhibitor, emulsifying agent, preservative, pH adjuster, flavor, seasoning agent, edulcorant, acidulant, quality stabilizer, alone or in combination, may be mixed in the bottleable green tea beverage related to the present embodiment.

For instance, vitamin C (ascorbic acid or ascorbic acid salt), vitamin E, cysteine, and the like can be used as oxidation inhibitor; in particular, inclusion of 0.005 to 0.2 mass percent of vitamin C is adequate. In addition, if the pH is adjusted to 5 to 7, and among this range, to 5.5 to 6.5, using sodium bicarbonate, potassium carbonate, or the like as a pH adjuster, the flavor and stability during conservation of the green tea beverage can be kept, which is therefore preferred.

For instance, glucose, fructose, isomerized liquid sugar syrup, fructooligosaccharide, emulsified oligosaccharide, soybean oligosaccharide, cyclodextrin, aspartame, rakanka extract, and the like may be used as edulcorant, and in particular, including 0.01 to 1.0 mass percent of cyclodextrin is adequate. By mixing these additives alone or in combination, a more suitable beverage can be provided. In addition, the beverage can be suitably diluted with water to adjust the concentration of catechins and mixture to be at drinking concentration.

(Containment)

The bottleable green tea beverage related to the present embodiment can be provided in the form of a conventional container similar to conventional beverages, such as a formed container made of plastic, for instance, a formed container with polyethylene terephthalate as a main component (so-called PET bottle), a metal can, a paper container combined with a metal foil or a plastic film, or a bottle, and is prepared by filling these containers with the green tea beverage prepared as described above. During this filling, if the filling environment or the container interior is substituted with inert gas, such as nitrogen gas, oxidation of the bottleable green tea beverage is adequately prevented.

Further, if a metal can is to be filled, heat sterilization is carried out under conditions defined by Food Sanitation Law after the container has been filled. For those containers that cannot be retort sterilized, such as PET bottle and paper container, a method is adopted in which heat sterilization is carried out under similar sterilization conditions as described above, for instance, with a plate heat exchanger and the like, then cooling to a given temperature and filling the container. In addition, under sterile conditions, a container can be filled by mixing another component. Furthermore, operations, such as heat sterilizing under acidic conditions, then returning the pH to neutrality under sterile conditions, or heat sterilizing under neutral pH conditions, then adjusting the pH under sterile conditions, are also possible.

(Evaluation of Diffuse Transmittance)

The diffuse transmittance of green tea beverage related to the present embodiment is measured using a hazemeter and managed with the criteria that it is 1.0% or less.

It suffices to carry out the measurement of diffuse transmittance in any among a green tea extract immediately after an ultrafiltration step, or before or after a heat sterilization step, or a bottleable green tea beverage immediately after manufacturing. A manufacturing condition is preferably applied, where a portion of each lot of a green tea beverage is sampled and the diffuse transmittance is measured as described previously so that it is 1.0% or less, for among which, a green tea beverage immediately prior to filling in case a metal can, or a green tea beverage after heat sterilization in case a container that cannot be retort sterilized, such as a PET bottle or a paper container.

In general, for a green tea beverage subjected to ultrafiltration under the conditions described previously, the diffuse transmittance is 1.0% or less. However, in the event the diffuse transmittance is measured and the value exceeds 1.0%, it suffices to subject it to ultrafiltration again.

EXAMPLE

Examples of the present invention will be shown in the following; however, the scope of the patent is not limited to the examples.

(Quantitation of Catechins)

The HPLC gradient method was used for the component analysis of catechins. The analytical conditions were as follows:

Column: YMC J'sphere ODS-H80 φ4.6×250 mm
Mobile phase:
Gradient elution method using
Solution A: acetonitrile:water:phosphoric acid=5:94.9:0.1
Solution B: acetonitrile:water:phosphoric acid=50:49.9:0.1
(The programs for the gradients are shown in Table 1.)
Amount injected: 10 μL
Flow rate: 1.0 ml/min.
Detection: UV 230 nm
Column temperature: 40° C.

TABLE 1

| Program (min) | Flow rate (ml/min) | Solution A (%) | Solution B (%) |
|---|---|---|---|
| INITIAL | 1.0 | 95 | 5 |
| 5.0 | 1.0 | 95 | 5 |
| 10.0 | 1.0 | 90 | 10 |
| 15.0 | 1.0 | 90 | 10 |
| 25.0 | 1.0 | 80 | 20 |
| 40.0 | 1.0 | 80 | 20 |
| 45.0 | 1.0 | 20 | 80 |
| 55.0 | 1.0 | 20 | 80 |
| 60.0 | 1.0 | 95 | 5 |
| 74.0 | 1.0 | 95 | 5 |

Calibration curve construction method: Each catechin reference product (manufactured by Kurita Water Industries Ltd) was diluted with distilled water to obtain three concentrations in a range on the order of 10 ppm to 100 ppm to prepare the standard solutions. Standard solutions at each concentration were respectively injected into the HPLC, and a three-point calibration curve was constructed beforehand from the obtained peak area values and the concentrations.

Sample preparation method: 5 ml of sample to be quantified and characterized was accurately measured, introduced into a 50 ml volumetric flask, the volume was adjusted with distilled water, the resulting solution was filtered with a 0.45-μm membrane filter, then injected into HPLC and quantified with the three-point calibration curve method described previously.

When a value was shown to exceed a range of the calibration curve, the dilution factor was further increased to allow for a quantitation within the limits, and a reanalysis was performed.

(Separation and Quantitation of Glutamic Acid and Theanine)

Glutamic acid and theanine were quantified by the HPLC method using fluorescence detection with the ortho-phthalaldehyde reaction solution. The analytical conditions were as follows:

Column: Wakosil-II 5C18HG φ4.6×250 mm
Mobile phase:
Gradient elution method using:
Solution A: 50 mM sodium acetate (adjusted to pH 6.0 with acetic acid)
Solution B: 100% acetonitrile
(The programs for the gradients are shown in Table 2.)
Color reagent: o-phthalaldehyde reagent (OPA)
O-phthalaldehyde in the amounts of 246 mg was dissolved in 20 ml of 0.1 M boric acid buffer solution (adjusted to pH 10.0 with 1 M NaOH), and 200 μL of 2-mercaptoethanol was added.
Amount injected: 5 μm each of OPA, sample and OPA; 15 μm total
Flow rate: 1.0 ml/min
Detection: fluorescence detector with excitation wavelength at 340 nm and detection wavelength at 455 nm
Column temperature: 40° C.

TABLE 2

| Program (min) | Flow rate (ml/min) | Solution A (%) | Solution B (%) | Gradient curve |
|---|---|---|---|---|
| INITIAL | 1.0 | 88 | 12 | * |
| 10.00 | 1.0 | 88 | 12 | 11 |
| 10.01 | 1.0 | 84 | 16 | 11 |
| 25.00 | 1.0 | 84 | 16 | 11 |
| 25.01 | 1.0 | 82 | 18 | 11 |
| 40.00 | 1.0 | 82 | 18 | 11 |
| 45.00 | 1.0 | 55 | 45 | 6 |
| 60.00 | 1.0 | 55 | 45 | 11 |
| 61.00 | 1.0 | 88 | 12 | 6 |
| 76.00 | 1.0 | 88 | 12 | 11 |

Calibration curve construction method: glutamic acid (Wako Pure Chemical Industries, Ltd.), theanine (manufactured by Tokyo Kasei Kogyo Co., Ltd.) reference products were respectively diluted with distilled water to obtain three concentrations in a range on the order of 1 ppm to 30 ppm to prepare the standard solutions. Standard solutions at each concentration were respectively injected into the HPLC, and a three-point calibration curve was constructed from the obtained peak area values and the concentrations.

Sample preparation method: 5 ml of sample was accurately measured, introduced into a 25-ml volumetric flask, the volume was adjusted with distilled water, the resulting solution was filtered with a 0.45-μm membrane filter, then injected into HPLC and quantified by the standard reagent solution with the three-point calibration curve method.

When a value was shown to exceed a range of the calibration curve, the dilution factor was further increased to allow for a quantitation within the limits, and a reanalysis was performed.

(Measurement of Diffuse Transmittance)

The diffuse transmittance was analyzed for beverages canned immediately after manufacturing and for canned beverages stored after manufacturing at 60° C. for two weeks, according to the method described in JIS K7105, using the hazemeter HM-150 manufactured by Murakami Color Research Laboratory at a product temperature of 25° C.

(Evaluation of Sediment Occurrence)

The situation of sediment occurrence was evaluated visually for green tea beverages bottled in heat-resistant bottles after storage at 4° C. or 60° C. for two weeks.

−: none
+: slight sedimentation (fine powders present)
++: some sedimentation
+++: fair amount of sediment ++++: large amount of sediment
+++++: extremely large amount of sediment
(Sensory Evaluation)

For the sensory characteristics, beverages stored at 25° C. for two weeks, and beverages from samples stored at 25° C., which were warmed to 60° C. immediately before sensory evaluation, were scored by five trained examiners according to the evaluation sheet of Table 3 for each of "irritation upon mouth contact," "astringency," "thickness," which characterize a green tea beverage, using a seven-stage evaluation. In addition, the overall "tastiness" as green tea beverage, which takes into account the balance of "irritation upon mouth contact," "astringency",and "thickness," and other tastes, was also evaluated.

TABLE 3

| Score | Irritation upon mouth contact | Astringency | Thickness | Tastiness |
|---|---|---|---|---|
| 1 | Extremely strong | Extremely strong | Extremely weak | Extremely not tasty, not acceptable |
| 2 | Strong | Strong | Weak | Not tasty, not acceptable |
| 3 | Rather strong | Rather strong | Rather weak | Rather not tasty, but acceptable |
| 4 | Neither | Neither | Neither | Ordinary |
| 5 | Rather weak | Rather weak | Rather strong | Rather tasty |
| 6 | Weak | Weak | Strong | Tasty |
| 7 | Extremely weak | Extremely weak | Extremely strong | Extremely tasty |

(Overall Evaluation)

The product value as bottleable green tea beverage was assessed by gathering the results from the evaluation of sediment occurrence and the sensory evaluation.

Excellent: is extremely desirable as heated, ordinary temperature, or refrigerated bottleable green tea beverage Good: is suitable as heated, ordinary temperature, or refrigerated bottleable tea beverage Comparatively poor: is suitable as ordinary temperature or refrigerated bottleable green tea beverage, but not suited for heating Poor: not suitable as bottleable green tea beverage (Example)

An extract obtained by extracting 60.0 g of green tea with 2500 ml of ion-exchanged water at 60° C. for 5 minutes was crudely filtered with a mesh and then cooled to 25° C. or below. Thereafter, 3.0 g of ascorbic acid was added, centrifugal separation (using the SA1 continuous centrifugal separator manufactured by Westfalia at a flow rate of 300 l/h, a rotation speed of 10000 rpm, and a centrifugal sedimentation surface of 1000 $m^2$) was performed, and then kieselguhr filtration (contact time: 30 minutes; filtration using 100 g of acid-treated diatomaceous earth with a Darcy value of 0.1, with 0.15 g/$cm^2$ per filtration area, by pressure) was carried out. Thereafter 4.0 g of ascorbic acid and sodium glutamate (manufactured by Hayashi Pure Chemical Industry, Ltd.; food additive) and epigallocatechin gallate TEAVIGO (DSM Nutritional Products) as shown in Table 4 were added so as to obtain various concentrations to the kieselguhr-filtered green tea extract; then, water was added as ion-exchanged water; furthermore, sodium bicarbonate was used to adjust the pH to 6.0 to 6.1, and the weight of the extract was adjusted to 10 kg. After adjustment, the temperature of the extract was heated up to 90° C. and the solution was canned by filling a steel can. Next, the filling beverage was heat sterilized (123° C., 10 minutes) to prepare a bottleable green tea beverage. One container of the prepared bottleable green tea beverage was opened, a fraction of the green tea beverage inside the container was sampled, and the concentration of each component and the diffuse transmittance immediately after manufacturing were measured. In addition, for sediment observation, a transparent heat-resistant bottle was filled separately and heat sterilized as described previously to prepare a bottleable green tea beverage.

The concentration of each component and the results of the above-mentioned evaluation from Examples 1 to 6 are shown in Table 4.

TABLE 4

| | Example 1 | Example 2 | Example 3 | Example 4 | Example 5 | Example 6 |
|---|---|---|---|---|---|---|
| | Unit for each component: mg/l | | | | | |
| Bx | 0.398 | 0.392 | 0.397 | 0.409 | 0.281 | 0.308 |
| pH | 6.11 | 6.09 | 6.07 | 6.08 | 6.10 | 6.00 |
| EGCg (A) | 459.8 | 470.1 | 444.6 | 454.0 | 182.3 | 273.1 |
| GCg (B) | 540.5 | 549.5 | 521.6 | 532.6 | 215.0 | 318.9 |
| A + B | 1000.3 | 1019.6 | 966.2 | 986.6 | 397.3 | 592.0 |
| 8 catechin species | 1251.9 | 1275.6 | 1208.2 | 1235.8 | 602.0 | 807.0 |
| Glutamic acid | 39.9 | 24.6 | 77.3 | 113.1 | 23.7 | 25.3 |
| Theanine | 15.7 | 15.7 | 15.2 | 14.1 | 16.2 | 16.1 |
| Diffuse transmittance % (immediately after manufacturing) | 0.2 | 0.2 | 0.1 | 0.2 | 0.1 | 0.1 |
| Diffuse transmittance % (after two weeks at 60° C.) | 0.3 | 0.3 | 0.3 | 0.2 | 0.1 | 0.1 |
| Occurrence of sediment (after two weeks at 4° C.) | — | — | — | — | | |
| Occurrence of sediment (after two weeks at 60° C.) | — | — | — | — | — | — |
| Irritation upon mouth contact (for 25° C. drink) | 4.2 | 3.0 | 4.6 | 5.6 | 6.2 | 5.2 |
| Astringency (for 25° C. drink) | 3.6 | 2.8 | 4.6 | 5.4 | 5.8 | 5.4 |
| Thickness (for 25° C. drink) | 4.0 | 4.0 | 3.6 | 3.4 | 3.0 | 4.0 |

TABLE 4-continued

| | Example 1 | Example 2 | Example 3 | Example 4 | Example 5 | Example 6 |
|---|---|---|---|---|---|---|
| Irritation upon mouth contact (for 60° C. drink) | 4.0 | 3.2 | 4.8 | 5.6 | 6.2 | 5.2 |
| Astringency (for 60° C. drink) | 3.8 | 3.2 | 5.4 | 5.8 | 6.0 | 5.2 |
| Thickness (for 60° C. drink) | 4.4 | 4.4 | 3.6 | 3.8 | 3.6 | 4.2 |
| Tastiness (for 25° C. drink) | 3.6 | 3.0 | 4.8 | 5.2 | 5.0 | 6.0 |
| Tastiness (for 60° C. drink) | 3.8 | 3.4 | 4.8 | 5.0 | 5.0 | 6.0 |
| Overall score | Good | Good | Excellent | Excellent | Excellent | Excellent |

Unit for each component: mg/l (Comparative Examples)

For Comparative Example 1, bottleable green tea beverage was prepared with a similar procedure to the Example, except that kieselguhr filtration after centrifugal separation was not carried out, glutamic acid was not added.

For Comparative Examples 3 and 5, bottleable green tea beverage was prepared with a similar procedure to the Example, except that kieselguhr filtration after centrifugal separation was not carried out.

For Comparative Example 2, bottleable green tea beverage was prepared with a similar procedure to the Example, except that glutamic acid was not added.

For Comparative Example 4, bottleable green tea beverage was prepared with a similar procedure to the Example, except that the glutamic acid content was 14.1 mg.

The concentration of each component and the results of the above-mentioned evaluation for Comparative Examples 1 to 5 are shown in Table 5.

TABLE 5

| | Comparative Example 1 | Comparative Example 2 | Comparative Example 3 | Comparative Example 4 | Comparative Example 5 |
|---|---|---|---|---|---|
| Bx | 0.390 | 0.396 | 0.398 | 0.389 | 0.471 |
| pH | 6.03 | 6.01 | 6.08 | 6.05 | 5.99 |
| EGCg (A) | 470.5 | 466.7 | 449.8 | 467.9 | 494.9 |
| GCg (B) | 545.8 | 539.2 | 524.0 | 545.2 | 575.7 |
| A + B | 1016.3 | 1005.9 | 973.8 | 1013.1 | 1070.6 |
| 8 catechin species | 1268.1 | 1257.3 | 1217.4 | 1265.1 | 1319.3 |
| Glutamic acid | 6.3 | 6.8 | 38.5 | 14.1 | 455 |
| Theanine | 12.8 | 14.9 | 14.8 | 14.1 | 18.6 |
| Diffuse transmittance % (immediately after manufacturing) | 4.6 | 0.2 | 4.5 | 0.2 | 5.4 |
| Diffuse transmittance % (after two weeks at 60° C.) | 4.5 | 0.2 | 4.6 | 0.3 | 5.3 |
| Occurrence of sediment (after two weeks at 4° C.) | — | | — | | |
| Occurrence of sediment (after two weeks at 60° C.) | ++++ | ++ | ++++ | + | +++++ |
| Irritation upon mouth contact (for 25° C. drink) | 3.6 | 2.6 | 4.0 | 3.0 | 4.6 |
| Astringency (for 25° C. drink) | 2.8 | 2.4 | 2.8 | 2.6 | 5.0 |
| Thickness (for 25° C. drink) | 3.8 | 3.6 | 3.2 | 3.8 | 4.2 |
| Irritation upon mouth contact (for 60° C. drink) | 3.6 | 2.8 | 4.2 | 3.4 | 4.4 |
| Astringency (for 60° C. drink) | 2.6 | 2.2 | 3.4 | 2.6 | 5.2 |
| Thickness (for 60° C. drink) | 4.2 | 4.0 | 3.6 | 4.4 | 4.4 |
| Tastiness (for 25° C. drink) | 2.8 | 2.0 | 2.8 | 2.4 | 2.0 |
| Tastiness (for 60° C. drink) | 3.0 | 2.8 | 4.0 | 2.8 | 2.2 |
| Overall score | Poor | Poor | Poor | Comparatively poor | Poor |

Unit for each component: mg/l (Discussion)

Evaluation results for Examples 1 to 6 are shown in Table 4. In Examples 1 to 4, with a total concentration in EGCg and GCg of approximately 1000 mg/l (total amount of 8 catechin species of approximately 1200 mg/l to 1300 mg/l) and various concentrations of glutamic acid (approximately 25 mg/l to 110 mg/l), the occurrence of sediment could be suppressed in any of the examples. In addition, in the sensory evaluation, "irritation upon mouth contact," "astringency," and "thickness" were balanced at both 25° C. and 60° C., and it was found that "tastiness" also increases with the glutamic acid content.

In addition, in Examples 5 and 6, with a total concentration in EGCg and GCg of approximately 400 mg/l to 600 mg/l (total amount of 8 catechin species of approximately 600 mg/l to 800 mg/l ) and the concentration of glutamic acid of approximately 25 mg/l, the occurrence of sediment could be suppressed as in Examples 1 to 4; as for sensory evaluation, the balance of "irritation upon mouth contact," "astringency" and "thickness",and "tastiness" were better for both 25° C. and 60° C.

Consequently, the overall score of bottleable green tea beverages of Examples 1 to 6 being excellent in their conservability at low temperature and when heated, as well as their senses at ordinary temperature and when heated, they are suitable as bottleable green tea beverages, among which, Examples 3 to 6 were found to be extremely good.

Meanwhile, evaluation results for Comparative Examples 1 to 5 are shown in Table 5. For Comparative Examples 1, 3, and 5, in which kieselguhr filtration after centrifugation filtration was not carried out, occurrence of sediment was observed noticeably after conservation at 60° C. In addition, for Comparative Examples 2 and 4, in which kieselguhr filtration was carried out, but glutamic acid content was less compared to Examples 1 to 6, the occurrence of sediment was also observed after conservation at 60° C.

In addition, regarding sensory evaluation, in Comparative Examples 1, 2, and 4 with a total concentration in EGCg and GCg of approximately 1000 mg/l (total amount of 8 catechin species of approximately 1200 mg/l to 1300 mg/l) and various concentrations of glutamic acid (approximately 6 mg/l to 14 mg/l ), "irritation upon mouth contact," "astringency," and "thickness" were enhanced compared to Examples 1 to 4 with the same order of catechin concentration, and the overall "tastiness" was found to be either similar or less.

Next, for Comparative Example 5 with a total concentration in EGCg and GCg of approximately 1000 mg/l (total amount of 8 catechin species of approximately 1300 mg/l) and a concentration in glutamic acid of approximately 455 mg/l, although "irritation upon mouth contact," "astringency," and "thickness" were balanced by the effect provided by the taste of glutamic acid, due to the taste of glutamic acid being too pronounced, the extent was not acceptable in terms of overall "tastiness."

Table 6 shows composition data of a commercial bottled tea beverage containing catechin in high concentrations (product name: Healthya Ryokucha, manufactured by Kao, a product exclusively for cold use, purchased in August 2004) as well as results when an unopened product was heated at 60° C. and conserved for two weeks. The value of diffuse transmittance prior to heating at 60° C. was high at 5.2%; in addition, occurrence of sediment after conservation at 60° C. was also prominent.

TABLE 6

|  | Unit for each component: mg/l Comparative Example 6 |
| --- | --- |
| Bx | 1.033 |
| pH | 5.90 |
| EGCg (A) | 367.6 |
| GCg (B) | 409.5 |
| A + B | 777.1 |
| 8 catechin species | 1763.2 |
| Glutamic acid | 26.8 |
| Theanine | 99.1 |
| Diffuse transmittance % (prior to heat treatment) | 5.2 |
| Occurrence of sediment (after two weeks at 60° C.) | ++++ |

What is claimed is:

1. A bottled green tea beverage containing a green tea extract obtained by extracting green tea leaves, wherein the content in epigallocatechin gallate and gallocatechin gallate is 380 mg/l to 1500 mg/l, the content of glutamic acid is 20 mg/l to 120 mg/l, and the diffuse transmittance is 1.0% or less.

2. The bottled green tea beverage as in claim 1, wherein the temperature of the bottled green tea beverage is from 50° C. to 70° C.

3. The bottled green tea beverage as in claim 1, wherein an amount of gallocatechin gallate is more than an amount of epigallocatechin gallate.

4. The bottled green tea beverage as in claim 1, wherein the bottled green tea beverage is sterilized.

5. A bottled green tea beverage containing a green tea extract obtained by extracting green tea leaves, wherein the total content of epigallocatechin gallate and gallocatechin gallate is 380 mg/l to 1500 mg/l, the content of glutamic acid is 20 mg/l to 120 mg/l, and the diffuse transmittance is 1.0% or less, wherein pH of the beverage is 5 to 7.

6. The bottled green tea beverage as in claim 5, wherein the temperature of the bottled green tea beverage is from 50° C. to 70° C.

7. The bottled green tea beverage as in claim 5, wherein an amount of gallocatechin gallate is more than an amount of epigallocatechin gallate.

8. The bottled green tea beverage as in claim 5, wherein the bottled green tea beverage is sterilized.

* * * * *